(12) United States Patent
Doss (10) Patent No.: US 8,522,745 B2
(45) Date of Patent: Sep. 3, 2013

(54) REINFORCED PISTON AND CONNECTING ROD ASSEMBLY

(76) Inventor: Eddie H. Doss, Nashville, TN (US)

( * ) Notice: Subject to any disclaimer, the term of this patent is extended or adjusted under 35 U.S.C. 154(b) by 339 days.

(21) Appl. No.: 12/911,069

(22) Filed: Oct. 25, 2010

(65) Prior Publication Data

US 2012/0097125 A1    Apr. 26, 2012

(51) Int. Cl.
*F02B 75/32* (2006.01)

(52) U.S. Cl.
USPC .............. 123/197.2; 123/197.4; 123/197.3

(58) Field of Classification Search
USPC ............ 123/193.6; 92/239, 255, 216, 175, 92/208; 29/888.046, 888.047, 888.091; 74/588, 579 E, 579 R
See application file for complete search history.

(56) References Cited

U.S. PATENT DOCUMENTS

| | | | |
|---|---|---|---|
| 1,362,313 A | | 12/1920 | Hollister |
| 1,367,478 A | | 2/1921 | Hapgood |
| 1,419,672 A | * | 6/1922 | Heslewood et al. ........... 277/479 |
| 1,700,604 A | | 1/1929 | Wagener |
| 1,744,588 A | | 1/1930 | Strauss |
| 1,913,513 A | * | 6/1933 | Rossman et al. .............. 403/152 |
| 2,262,052 A | * | 11/1941 | Schneider ...................... 277/480 |
| 2,341,836 A | | 2/1944 | Wood |
| 2,449,657 A | | 9/1948 | Kishline |
| 2,891,831 A | * | 6/1959 | Baker ............................ 277/485 |
| 3,184,245 A | * | 5/1965 | Woolcott ....................... 277/445 |
| 4,541,304 A | * | 9/1985 | Chikugo et al. ............ 74/579 E |
| 4,546,669 A | | 10/1985 | Fischer et al. |
| 4,555,961 A | * | 12/1985 | Fischer ....................... 74/579 E |
| 4,667,627 A | | 5/1987 | Matsui et al. |
| 4,848,291 A | | 7/1989 | Kawamura et al. |
| 5,016,807 A | | 5/1991 | Haack |
| 5,072,654 A | * | 12/1991 | MacGregor ..................... 92/157 |
| 5,370,093 A | | 12/1994 | Hayes |
| 6,209,510 B1 | * | 4/2001 | Brogdon et al. ........... 123/197.4 |
| 6,609,490 B2 | | 8/2003 | Flinchbaugh et al. |
| 7,281,449 B2 | | 10/2007 | Harimoto et al. |
| 2008/0264378 A1 | | 10/2008 | Mandel et al. |

FOREIGN PATENT DOCUMENTS

| | | |
|---|---|---|
| CH | 85619 | 7/1920 |
| DE | 19844991 | 3/2000 |
| DE | 10360742 | 7/2005 |

(Continued)

OTHER PUBLICATIONS

International Search Report, four pages, dated Feb. 22, 2012.

*Primary Examiner* — Lindsay Low
*Assistant Examiner* — Syed O Hasan
(74) *Attorney, Agent, or Firm* — Waddey & Patterson, PC; Matthew C. Cox (57) ABSTRACT

A reinforced piston assembly provides a piston having a corrugated insert supporting an outer piston layer. The corrugated insert can include lateral, concentric or radial corrugations and can include regular or irregular corrugation spacing. The corrugated insert in some embodiments forms a circular disk and can include a plurality of insert holes defined in the disk. A laminated connecting rod having at least two rod layers is pivotally attached to the piston in some embodiments. The laminated connecting rod provides a first end having a diverging section with first and second rod prongs each forming a wrist pin socket. A wrist pin can extend through each socket, and a sleeve is disposed about the wrist pin between the wrist pin sockets. Additionally, one or more flanges can extend from the opposite end of the connecting rod, and a base cap including one or more flange recesses is positioned on the connecting rod for securing the connecting rod to a crankshaft.

25 Claims, 8 Drawing Sheets

(56) References Cited

FOREIGN PATENT DOCUMENTS

| | | |
|---|---|---|
| DE | 102006029040 | 1/2008 |
| EP | 1308265 | 5/2003 |
| EP | 1818531 | 8/2007 |
| GB | 848734 | 9/1960 |
| JP | 58148036 A | 9/1983 |
| JP | 2004324760 A | 11/2004 |
| JP | 2008240976 A | 10/2008 |
| JP | 2009074667 A | 4/2009 |
| JP | 2009115277 A | 5/2009 |

* cited by examiner

REINFORCED PISTON AND CONNECTING ROD ASSEMBLY

BACKGROUND

1. Technical Field

The present invention relates to reciprocating machinery and more particularly to piston and connecting rod components of the types used in reciprocating engines, fluid pumps, compressors, vacuum pumps and other types of piston-driven machinery.

2. Background Art

Power transmission hardware such as pistons, connecting rods and crankshafts are known in the art for use in reciprocating engines. In such engines, one or more pistons are generally disposed in a hollow engine cylinder. A pressure source is applied within the closed volume of the cylinder to displace the piston axially along the cylinder. The linear motion of the piston can be converted to rotating shaft power using a connecting rod coupled to the piston at one end and coupled to an eccentric crankshaft at the opposite end. Typically, the crankshaft includes a rod bearing offset from the crankshaft axis of rotation, and the connecting rod is pivotally attached to the crankshaft at the offset location. As the piston moves toward the crankshaft, linear motion of the piston is converted to rotational motion of the crankshaft as the connecting rod forces the crankshaft to rotate about the connecting rod axis of rotation. Conversely, as the crankshaft rotates, additional connecting rods connected at various offset angles relative to the crankshaft axis of rotation can convert rotational motion of the connecting rod into linear motion of additional pistons for providing a compression stroke in one or more additional cylinders of the engine.

During both power and compression strokes, conventional piston and connecting rod assemblies are subjected to mechanical stress due to the pressure and heat associated with moving the piston inside the cylinder. To better manage this stress and to prevent accelerated piston and connecting rod wear and failure, conventional piston and connecting rod assemblies typically include solid metal materials. Such materials can increase the weight of the engine components resulting in reduced efficiency and lowered engine performance.

It is generally desirable in the art of reciprocating engines to produce connecting rod and piston assemblies having a reduced weight. By reducing the weight of the engine components greater fuel efficiency and improved engine performance can be realized. Additionally reduced weight and reduced material volume in the piston and connecting rod assembly can improve heat transfer and power output in many applications.

Others in the art have attempted to reduce connecting rod and piston assembly weight and material volume by reducing the thickness of the connecting rod and also by reducing the thickness of the piston skirt and/or piston face. However, a reduction in the thickness and material volume of these parts can reduce structural integrity resulting in premature wear or engine failure.

Further improvements to conventional piston and connecting rod assemblies for reducing the weight and material volume of engine components and for improving engine performance are needed.

BRIEF SUMMARY

One aspect of the present invention provides a piston assembly for use in an engine. The assembly includes a piston having a piston face and a piston skirt. The piston skirt defines a skirt opening and a hollow interior cavity. The piston further includes an inner piston layer, an outer piston layer, and a corrugated insert disposed between the inner and outer piston layers. The assembly also includes a connecting rod pivotally attached to the piston. The connecting rod includes first and second rod layers, and the first and second rod layers are rigidly connected to each other.

Yet another aspect of the present invention provides a reinforced piston apparatus for use in an engine. The piston apparatus includes a piston body having a piston skirt defining a hollow interior cavity. The piston body includes a skirt rim positioned along an axial edge of the skirt. A circumferential interior flange extends from the skirt toward the hollow interior cavity. An inner piston layer spans the hollow interior cavity adjacent the interior flange. An outer piston layer is attached to the skirt rim and defines a gap between the inner piston layer and the outer piston layer. A corrugated insert is disposed between the inner and outer piston layers.

A further aspect of the present invention provides a connecting rod apparatus for joining a crankshaft to a piston in an engine. The apparatus includes a plurality of rod layers rigidly attached together. In some embodiments, the connecting rod apparatus includes a diverging section wherein at least two of the plurality of rod layers diverge into separate prongs—the first diverging rod layer forming a first rod prong and the second diverging rod layer forming a second rod prong. In additional embodiments, one or more rod layers include a flat section and an angled section oriented at a diverging angle relative to the flat section. Holes can be defined in only one or in more than one rod layer on the connecting rod at various locations, including along the flat or angled section.

Numerous other objects, features and advantages of the present invention will be readily apparent to those skilled in the art upon a reading of the following disclosure when taken in conjunction with the accompanying drawings.

DETAILED DESCRIPTION

Figure 1:
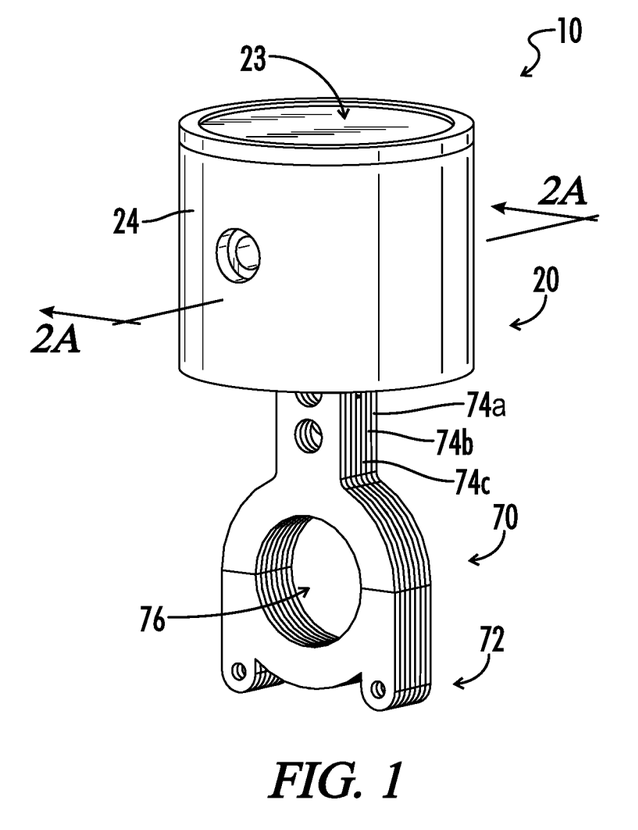
FIG. 1 illustrates a perspective view of one embodiment of a reinforced piston assembly in accordance with the present invention.

Referring now to the drawings, FIG. 1 illustrates a perspective view of one embodiment of a reinforced piston assembly generally designated by the numeral 10. In the drawings, not all reference numbers are included in each drawing for the sake of clarity. In addition, positional terms such as "upper," "lower," "side," "top," "bottom," "inner," "outer," etc. refer to the apparatus when in the orientation shown in the drawings. The skilled artisan will recognize that the apparatus can assume different orientations when in use.

Referring again to FIG. 1, an embodiment of a reinforced piston assembly 10 is generally illustrated. Piston assembly 10 generally includes a piston 20. Piston 20 in some embodiments is adapted for reciprocating motion in a cylinder of the type found in an engine, compressor, pump, vacuum pump or other types of piston-driven machinery. Piston 20 includes a piston face 23 generally facing away from the piston 20. During use, piston face 23 engages pressurized gas housed in the engine cylinder, for example following combustion of a fuel and air mixture. In some applications, piston face 23 engages pressurized gas injected directly into a cylinder of an engine. Piston face 23 can compress gas in the piston cylinder during a compression stroke, or it can be acted upon by expanding pressurized gas during a power stroke. Piston 20 further includes a piston skirt 24 extending along the outer perimeter of the piston 20 generally away from the piston face 23. The piston skirt 24 engages the walls of the piston cylinder in a sliding motion during reciprocation of piston 20 in the engine cylinder. In some embodiments, the piston skirt 24 can include one or more circumferential grooves 36, or channels, shaped for receiving a piston ring.

The embodiment of a piston assembly 10 illustrated in FIG. 1 further includes a connecting rod 70 pivotally attached to piston 20. The connecting rod 70 in some embodiments includes multiple rod layers 74a, 74b, 74c, etc. The first and second rod layers 74a, 74b are rigidly connected to each other by a fastening means. The connecting rod 70 generally defines a rod bearing opening 76 shaped for pivotally attaching connecting rod 70 to a crankshaft, and more particularly for attaching connecting rod 70 to an offset rod bearing or journal bearing on an eccentric camshaft of the type found in reciprocating engines. In some embodiments, connecting rod 70 includes a bearing cap 72 removably attached to the connecting rod 70. It will be readily appreciated by those of skill in the art that a piston 20 in accordance with the present invention can be interchangeably used with other types of connecting rods known in the art. Similarly, connecting rod 70 can be interchangeably used with other types of pistons known in the art. The piston and connecting rod assembly 10 seen in FIG. 1 in some embodiments can be used to reduce the weight and/or size of an engine and can improve engine performance.

Figures 2A, 2B, 2C:
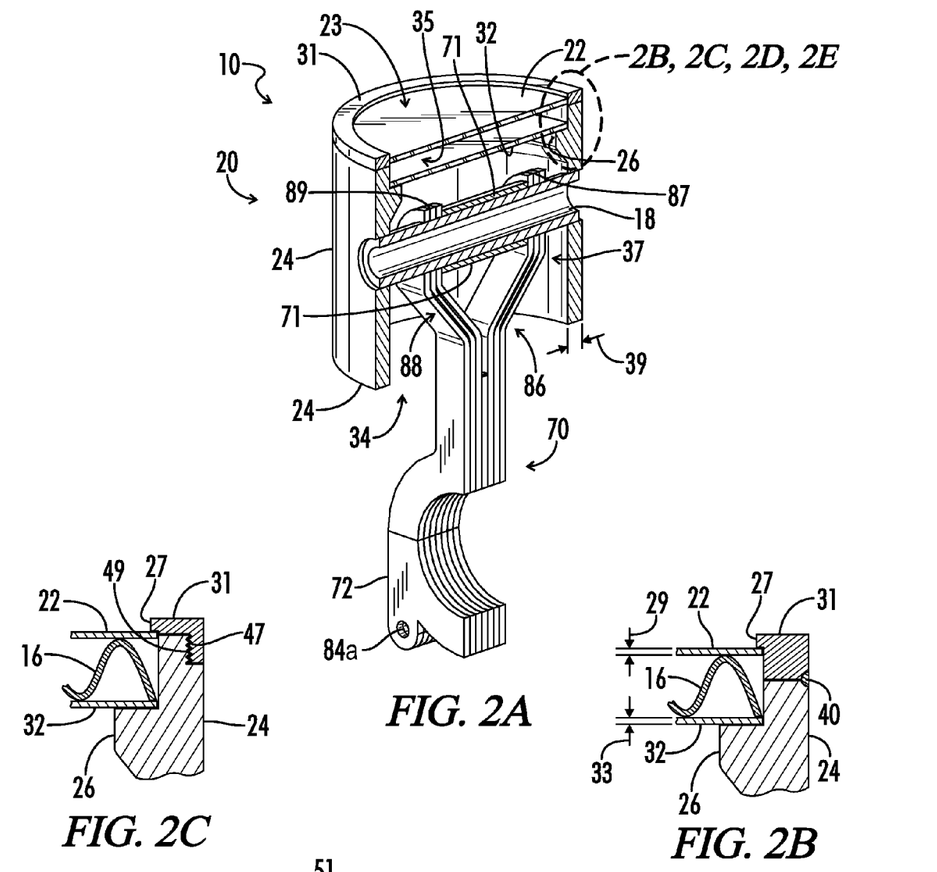
FIG. 2A illustrates a partial cross-sectional view of one embodiment of a reinforced piston assembly in accordance with the present invention.
FIG. 2B illustrates a detailed partial cross-sectional view of one embodiment of a skirt rim.
FIG. 2C illustrates a detailed partial cross-sectional view of one embodiment of a skirt rim.

Referring now to FIG. 2A, an embodiment of a piston assembly 10 is generally illustrated showing a broken-away perspective view. The piston assembly 10 generally includes a piston 20 having a piston face 23 and a piston skirt 24. The piston skirt 24 defines a skirt opening 34, and a hollow interior cavity 37 is partially enclosed by the skirt 24. In some embodiments, piston skirt 24 includes a skirt thickness 39. The skirt thickness 39 can vary along the axial length of skirt 24. Piston skirt 24 in some embodiments has a substantially cylindrical shape. In other embodiments, piston skirt 24 can have a generally elliptical shape or various other linear or curvilinear shapes not shown. Piston skirt 24 can be constructed of iron, steel, brass, bronze, aluminum, titanium, plastic, fiberglass, carbon-fiber, ceramics, nickel, silicon, mixtures or alloys thereof, or other rigid materials known in the art.

Piston 20 also generally includes a skirt rim 31 positioned along an axial edge of piston skirt 24 generally opposite the skirt opening 34. As seen in FIG. 2B, skirt rim 31 in some embodiments can include a rim flange 27 protruding from skirt rim 31 away from piston skirt 24. Rim flange 27 can be milled or forged onto skirt rim 31. In some embodiments, rim flange 27 can be pressed downward from an extension of skirt rim 31 using a mechanical press. In some embodiments, skirt rim 31 can be welded to the piston skirt 24 by rim weld 40, seen in FIG. 2B. Rim weld 40 can extend around the perimeter of skirt rim 31, and the weld bead can be ground or polished so that the weld bead is coextensive with the surface of skirt 24. As seen in FIG. 2C, in some embodiments, skirt rim 31 is a detachable annular ring positioned on an axial end of skirt 24. Skirt rim 31 can be secured to skirt 24 using a threaded connection in some embodiments. For example, as seen in FIG. 2C, skirt rim 31 can include a rim thread 47 facing and threadedly engaging a corresponding skirt thread 49 defined on the piston skirt 24. Using this configuration, skirt rim 31 can be removed from skirt 24 by unscrewing skirt rim 31.

Referring again to FIG. 2A, piston 20 includes an outer piston layer 22. Outer piston layer 22 generally includes an exterior piston face 23 that directly engages pressurized gas during operation of the piston inside an engine cylinder. Outer piston layer 22 in some embodiments forms a pressure diaphragm. Piston face 23 can include a smooth surface as illustrated in FIG. 2A. In some embodiments, piston face 23 includes a textured surface having one or more recessions defined in the piston face 23. Such recessions are operable for improving piston performance. Outer piston layer 22 in some embodiments includes a thin metal sheet formed in the shape of a circular disk. Outer piston layer 22 can be rigidly attached to the piston skirt 31 using a mechanical fastening means such as welding or using one or more mechanical fasteners. In one embodiment, as illustrated for example in FIG. 2D, outer piston layer 22 includes an outer edge 51 defined around the outer perimeter of outer piston layer 22. The outer edge 51 in some embodiments is clamped between the skirt rim 31 and the piston skirt 24 when the skirt thread 49 engages rim thread 47. Additionally, using the threaded configuration seen in FIG. 2C and FIG. 2D, in some embodiments the skirt rim 31 can be threadedly removed for replacement of outer piston layer 22. Thus, various outer piston layers 22 having different thicknesses 29 and geometric configurations or material compositions can be interchangeably used with one piston 20

Figure 7A:
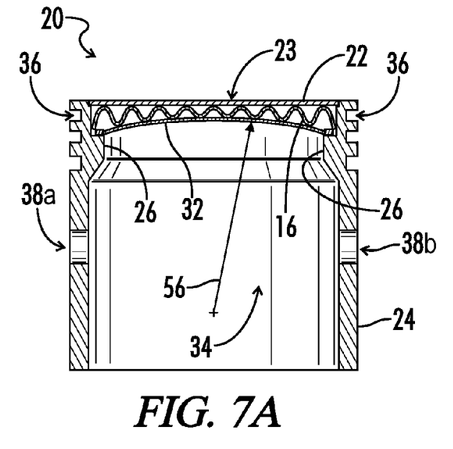
FIG. 7A illustrates a partial cross-sectional view of one embodiment of a piston in accordance with the present invention showing a reinforced disk having a curved inner side and a curved inner disk.
Figure 7B:
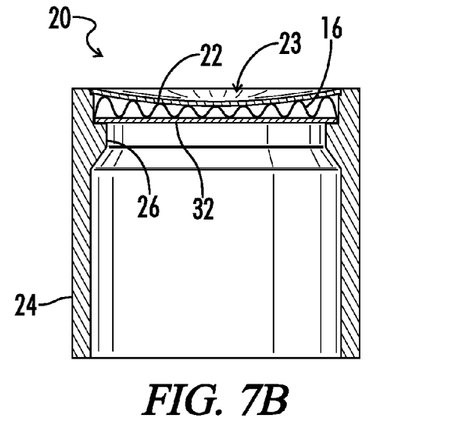
FIG. 7B illustrates a partial cross-sectional view of one embodiment of a piston in accordance with the present invention showing a reinforced disk having a curved outer side and a curved outer disk.
Figure 7C:
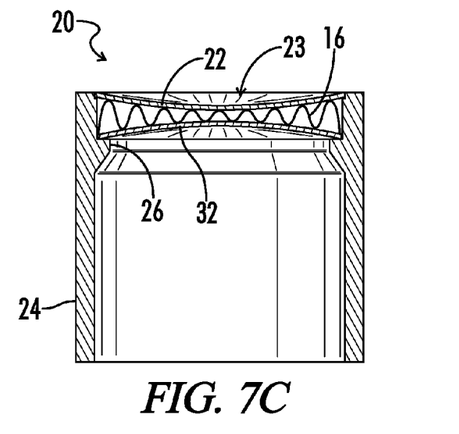
FIG. 7C illustrates a partial cross-sectional view of one embodiment of a piston in accordance with the present invention showing a reinforced disk having curved inner and outer sides, a curved outer disk, and a curved inner disk.
Figure 7D:
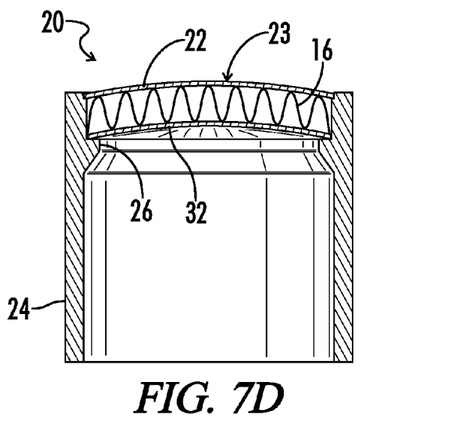
FIG. 7D illustrates a partial cross-sectional view of another embodiment of a piston in accordance with the present invention showing a reinforced disk having curved inner and outer sides, a curved outer disk, and a curved inner disk.

Outer piston layer 22 can include a stamped or pressed metal disk having a thickness between about 0.2 mm and about 1.5 mm. In other embodiments, outer piston layer 22 includes a metal disk having a thickness less than about 2.0 mm. In a preferred embodiment, outer piston layer 22 includes a thickness between about 0.3 mm and about 0.8 mm and comprises steel. It will be appreciated by those of skill in the art that outer piston layer 22 can also include a concave or convex dome shape. For example, as illustrated in FIGS. 7B and 7C, outer piston layer 22 includes a concave shape. In another embodiment, seen in FIG. 7D, outer piston layer 22 can include a convex shape. Outer piston layer 22 can include a uniform thickness. In some other embodiments, outer piston layer 22 includes a non-uniform thickness. For example, outer piston layer 22 includes a greater thickness near the outer perimeter of outer piston layer 22 and a reduced thickness near the center of outer piston layer 22. In some embodiments, outer piston layer 22 acts as a thermal barrier to reduce heat loss through the piston assembly. Outer piston layer 22 in one embodiment includes a steel material coated with a ceramic or other thermally insulative material to reduce heat loss.

Referring further to FIG. 2A, in the illustrated embodiment, piston 20 includes an interior skirt flange 26 protruding inwardly from skirt 24 toward the hollow interior cavity 37. Interior skirt flange 26 can form a continuous annular ring protruding radially inwardly from the skirt 24. In other embodiments, interior skirt flange 26 can be discontinuous, or segmented around the inner perimeter of skirt 24. In one embodiment, interior skirt flange 26 is integrally formed on skirt 24. Interior skirt flange 26 can protrude a distance between about 0.5 mm and about 20.0 mm in some embodiments.

Figure 2D:
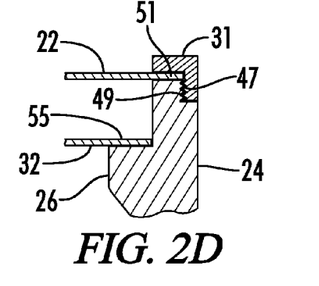
FIG. 2D illustrates a detailed partial cross-sectional view of one embodiment of a skirt rim.

Referring further to FIG. 2A, in some embodiments piston 20 includes an inner piston layer 32 spanning hollow interior cavity 37. Inner piston layer 32 in some embodiments is positioned adjacent interior skirt flange 26 and is supported axially by interior skirt flange 26. As seen in FIG. 2D, inner piston layer 32 includes an inner piston layer perimeter edge 55 engaging interior skirt flange 26. Interior skirt flange 26 generally supports inner piston layer 32, and particularly inner piston layer perimeter edge 55, during motion of piston 20 in the engine cylinder. For example, during a compression stroke, inner piston layer 32 can be pushed axially toward hollow interior cavity 37, and interior skirt flange 26 provides support to inner piston layer 32 to prevent inward displacement of inner piston layer 32 toward interior cavity 37.

Figure 2E:
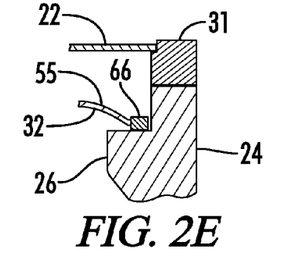
FIG. 2E illustrates a detailed partial cross-sectional view of one embodiment of a skirt rim.

As seen in FIG. 2E, in some embodiments, inner piston layer 32 can include a circumferential support ring 66 attached to the inner piston layer perimeter edge 55. Support ring 66 can be welded or mechanically fastened onto inner piston layer 32. Support ring 66 alternatively can be integrally formed on inner piston layer 32. In some embodiments, inner piston layer perimeter edge 55 is deformed in a mechanical process such as rolling, pressing or stamping to integrally form circumferential support ring 66 on inner piston layer 32. In some embodiments, inner piston layer 32 and support ring 66 comprise dissimilar materials. For example, in some embodiments inner piston layer 32 includes aluminum or steel and support ring 66 includes steel or titanium.

Inner piston layer 32 can generally include a metal disk. In some embodiments, inner piston layer 32 is formed in a stamping process. Inner piston layer 32 can form a flat metal disk. In other embodiments, inner piston layer 32 can have a curved shape such as a concave or a convex dome. For example, inner piston layer 32 as illustrated in FIG. 2E and also in FIGS. 7A, 7C and 7D includes a generally convex shape. Inner piston layer 32 in some embodiments includes a uniform inner piston layer thickness 33, seen in FIG. 2B. In other embodiments, inner piston layer 32 includes a non-uniform inner piston layer thickness 33. For example, inner piston layer 32 can include a thicker material composition near the inner piston layer perimeter edge 55 and a thinner material composition near the center of inner piston layer 32. Such variation in thickness 33 of inner piston layer 32 in some embodiments reduces weight without sacrificing strength and can improve engine performance. In some embodiments, inner piston layer 32 includes an inner piston layer thickness 33 between about 0.5 mm and about 2.0 mm. In other embodiments, inner piston layer thickness 33 is between about 0.5 mm and about 0.8 mm.

Figure 3:
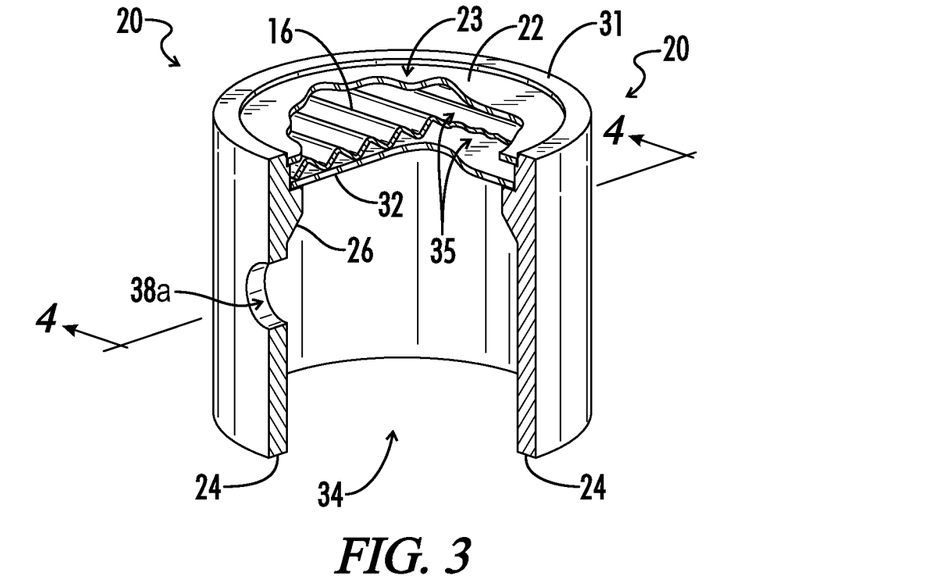
FIG. 3 illustrates a partially broken-away perspective view of one embodiment of a piston assembly in accordance with the present invention.

Referring again to FIG. 2A, outer piston layer 22 and inner piston layer 32 define a gap, or interior volume space 35, therebetween. Gap 35 forms a cavity between inner piston layer 32 and outer piston layer 22. Referring now to FIG. 3, in some embodiments, a middle layer is positioned between inner piston layer 32 and outer piston layer 22. The middle layer in some embodiments includes a corrugated insert 16 positioned in gap 35 between inner piston layer 32 and outer piston layer 22. Part of a corrugated insert 16 is also generally illustrated in some embodiments in FIGS. 2B and 2C. Corrugated insert 16 is sandwiched between inner piston layer 32 and outer piston layer 22 and generally reinforces, or supports, outer piston layer 22 during movement of piston 20. Corrugated insert 16 is generally housed between inner and outer piston layers 32, 22 and can directly contact one or both layers in some embodiments.

Corrugated insert 16 can include a stamped or pressed metal disk. Corrugated insert 16 generally can include a metal, a ceramic, or any other material suitable for withstanding heat and pressure experienced during engine operation. Corrugated insert 16 can include, for example but not limited to, aluminum, steel, titanium, silicon, nickel, bronze, brass, plastic, fiberglass, carbon-fiber or various alloys thereof. In some embodiments, corrugated insert 16 includes a spring steel. Corrugated insert 16 in some embodiments includes a complex geometry three-dimensional geometry. Corrugated insert 16 can also provide support to inner piston layer 32 in some applications.

Figure 5A:
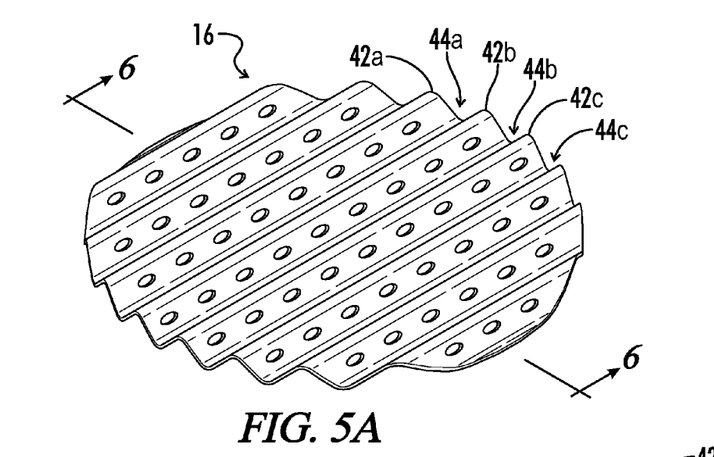
FIG. 5A illustrates a perspective view of one embodiment of a corrugated insert in accordance with the present invention.
Figures 5B, 6A, 6B, 6C:
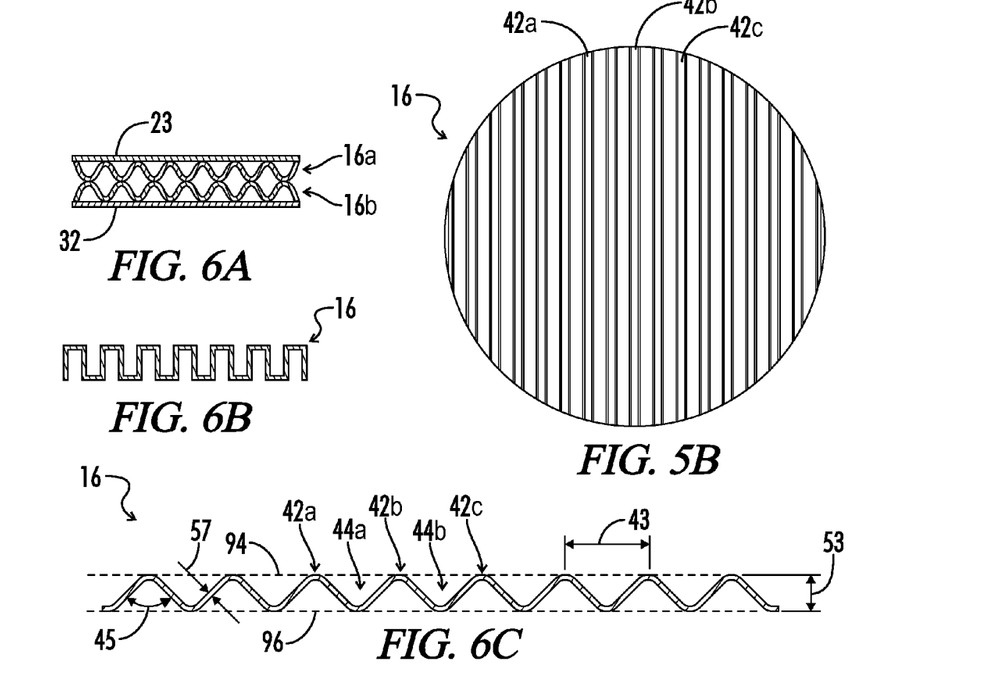
FIG. 5B illustrates a plan view of one embodiment of the corrugated insert of FIG. 5A.
FIG. 6A illustrates a partial cross-sectional view of an embodiment of a piston including multiple corrugated inserts.
FIG. 6B illustrates a partial cross-sectional view of an embodiment of a corrugated insert.
FIG. 6C illustrates a cross-sectional view of one embodiment of a corrugated insert indicated by Section 6-6 from FIG. 5A.

Referring again to FIG. 3 and also to FIG. 5A and FIG. 5B, in some embodiments, corrugated insert 16 includes a plurality of lateral corrugations. The term "lateral corrugation" generally refers to a substantially linear or curvilinear groove formed transversely across insert 16. Each lateral corrugation forms a lateral corrugation ridge 42a, 42b, 42c, etc. as seen in FIGS. 5A, 5B and FIG. 6C. Adjacent lateral corrugation ridges 42a, 42b, 42c, etc. are separated by lateral corrugation channels 44a, 44b, 44c, etc. Each adjacent corrugated ridge 42a, 42b, etc. is separated by a ridge spacing 43. Ridge spacing 43 between adjacent corrugated ridges can be uniform, providing corrugated ridges spaced at regular intervals. In other embodiments, subsequent adjacent corrugated ridges can have an irregular or non-uniform ridge spacing 43. For example, corrugated ridge spacing 43 can be closer near the center of corrugated insert 16 in some embodiments. In additional embodiments, corrugated insert spacing 43 can be greater near the middle and smaller near the outer perimeter of corrugated insert 16.

Referring again to FIG. 3 in some embodiments, corrugated insert 16 may not be attached to inner layers 32 or outer piston layers 23. In other embodiments corrugated insert 16 may be attached to inner piston layers 32 or outer piston layers 23 with welding, spot welding, brazing, adhesives, or mechanical fasteners.

Referring again to FIG. 2A and FIG. 3, in some embodiments, gap 35 between inner piston layer 32 and outer piston layer 23 may be filled with ambient air. In other embodiments gap 35 may be filled with argon, helium, nitrogen, carbon dioxide, mixtures thereof, or other gases, and gap 35 can be hermetically sealed to inhibit heat transfer and/or gas flux between inner piston layers 32 or outer piston layers 23. In other embodiments gap 35 may have a reduced pressure of ambient air vacuumed or otherwise removed to reduce weight and inhibit heat transfer between inner piston layers 32 and outer piston layers 23.

Figure 4:
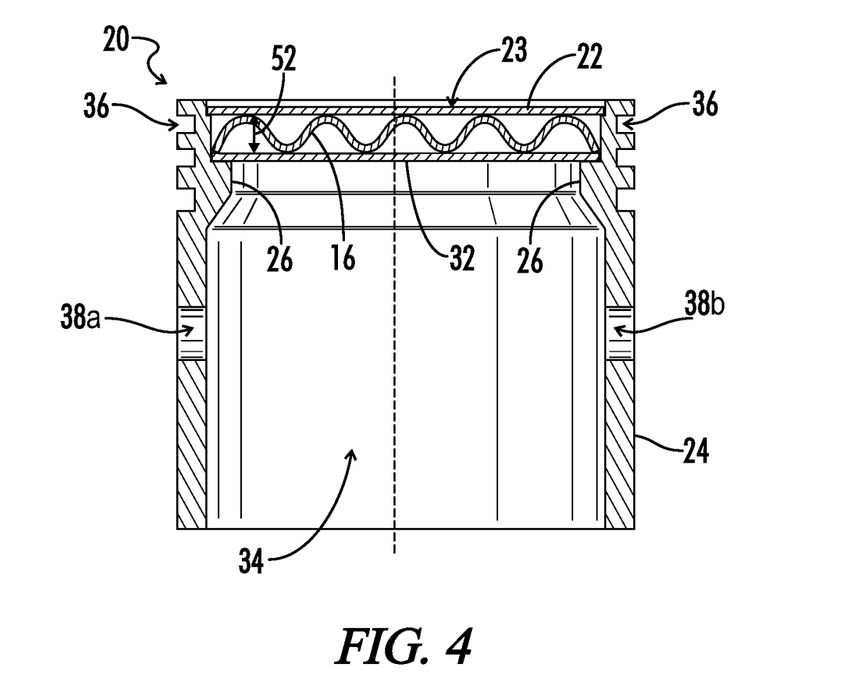
FIG. 4 illustrates a partial cross-sectional view of one embodiment of a reinforced piston indicated as Section 4-4 from FIG. 3.

A piston 20 can include a corrugated insert 16 having a plurality of lateral corrugations as illustrated in FIG. 3 and FIG. 4. As seen in FIG. 4, inner and outer piston layers 32, 22 define a gap height 52 between inner piston layer 32 and outer piston layer 22. Gap height 52 can range between about 1.0 mm and about 50 mm in some preferred embodiments. It will be readily appreciated by those of skill in the art that the dimensions recited herein can be scaled up for application on larger engines and scaled down for application on smaller engines. For example, in some embodiments, gap height 52 can be greater than 50 mm. Similarly, insert height 53 can range between about 1.0 mm and about 50 mm in some embodiments. In other embodiments, insert height 53 can be greater than about 50 mm. In some embodiments, corrugated insert 16 can include an insert height 53, seen in FIG. 6C, so that insert 16 is slightly compressed when positioned between inner piston layer 32 and outer piston layer 22, as seen in FIG. 3. For example, when insert 16 includes a resilient material such as metal, insert 16 can be dimensioned so that an insert interference ratio defined as the insert height 53 divided by gap height 52 exists. In some embodiments, the insert interference ratio is greater than one.

Referring again to FIG. 6C, in some embodiments, corrugated insert 16 includes an inner side 96 designated by a dashed line and generally adapted for engaging inner piston layer 32 and an outer side 94 designated by a dashed line and generally adapted for engaging outer piston layer 22. In some embodiments, insert height 53 is uniform, and inner side 96 and outer side 94 are substantially parallel, as seen in FIG. 6C. In other embodiments, insert height 53 is non-uniform. In some embodiments, inner side 96 and/or outer side 94 can be generally curved, or domed, forming a concave or a convex shape. For example, as seen in FIG. 7A, in some embodiments, insert 16 can include a substantially flat outer side and a curved inner side. Curved inner side of reinforced insert 16, as seen in FIG. 7A, generally corresponds to the radius of curvature 56 of inner piston layer 32.

In an additional embodiment, seen in FIG. 7B, corrugated insert 16 generally includes a flat inner side and a curved outer side. In this embodiment, curved outer side generally corresponds to the curvature profile of outer piston layer 22. In yet another embodiment, seen in FIG. 7C, piston 20 includes a concave-shaped outer piston layer 22, a convex shaped inner piston layer 32, and a corrugated insert 16 having a concave-shaped outer side and a convex-shaped inner side. In yet another embodiment, seen in FIG. 7D, piston 20 includes an outer piston layer 22 having a generally convex shape and an inner piston layer 32 also having a generally convex shape. In some embodiments, the curvature profiles of both inner piston layer 32 and outer piston layer 22 are the same. In yet other embodiments, the curvature profiles of inner piston layer 32 and outer piston layer 22 are different. Additionally, a reinforced layer, or corrugated insert 16 is positioned between inner piston layer 32 and outer piston layer 22. Corrugated insert 16 includes a convex-shaped outer side and a convex-shaped inner side to correspond to the curvature profiles of inner and outer piston layers 32, 22.

Figure 8:
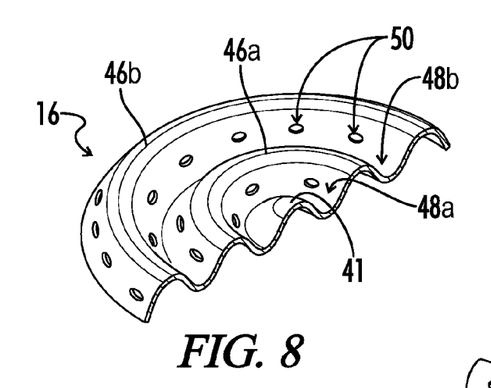
FIG. 8 illustrates a partially broken-away perspective view of one embodiment of a corrugated insert having substantially concentric corrugations in accordance with the present invention.

Referring now to FIG. 8, in some embodiments, corrugated insert 16 includes a plurality of corrugations oriented concentrically about a point on the insert 16. In some embodiments, the substantially concentric corrugations are radially-extending. For example, as illustrated in FIG. 8, insert 16 includes a disk center 41 and includes a plurality of interconnected corrugated ridges 46a, 46b, etc. extending radially outwardly in a substantially concentric manner around disk center 41. Adjacent concentric corrugated ridges 46a, 46b, etc. are separated by substantially concentric corrugated channels 48a, 48b, etc. As illustrated in FIG. 8, in some embodiments, corrugated insert 16 having radially-extending concentric corrugations includes a plurality of insert holes 50 defined in the insert 16. In some embodiments, insert holes 50 provide reduced weight of insert 16. Insert holes 50 can also be defined in a corrugated insert 16 having lateral corrugations, as illustrated in FIG. 5A.

Figure 9:
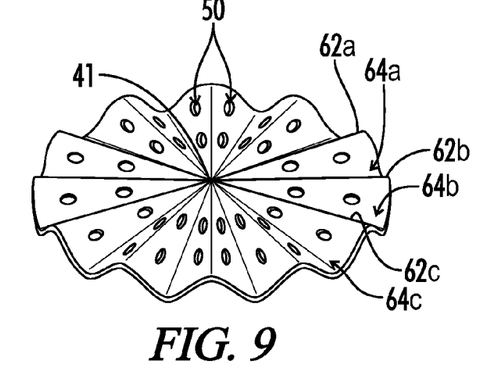
FIG. 9 illustrates a perspective view of one embodiment of a corrugated insert having substantially radial corrugations in accordance with the present invention.

Referring now to FIG. 9, in some embodiments, insert 16 includes a plurality of radial corrugations. Each radial corrugation includes a corrugated ridge 62a, 62b, 62c, etc. extending from the outer perimeter of disk 16 to a point on or near the disk center 41. Each adjacent radial corrugation ridge 62a, 62b, 62c, etc. is separated by a radial corrugation channel 64a, 64b, 64c, etc. Corrugated insert 16 having a radial corrugation pattern can also include one or more insert holes 50 and can be formed by pressing or stamping a metal disk. Insert holes 50 may consist of circular, oval, triangular, rectangular, or other geometric shapes in various spacing arrangements.

Figure 10:
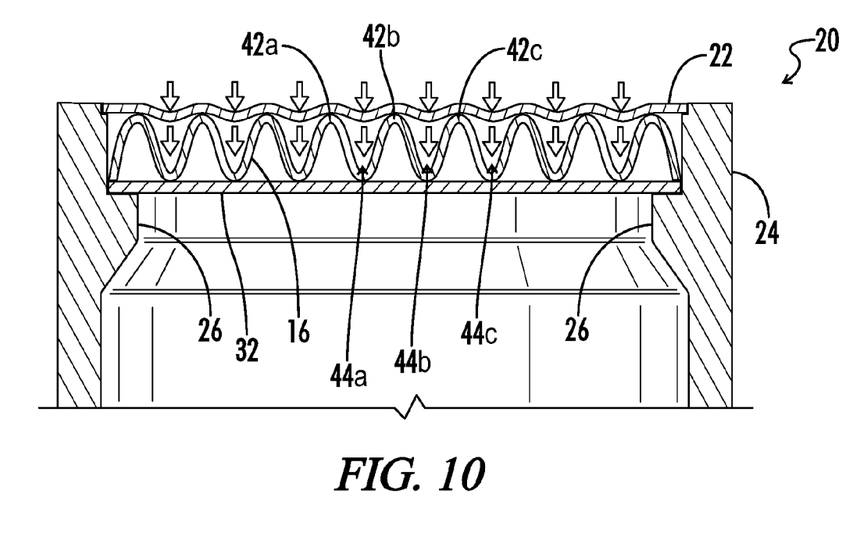
FIG. 10 illustrates a partial cross-sectional view of one embodiment of a piston showing an outer disk being partially deflected by a pressure source.

A piston having a corrugated insert 16 as discussed above generally allows reduction of the material volume in the outer layer. In conventional pistons, the outer layer can deflect or bend during engagement of the piston by compressed gas. To prevent such bending or deflection, conventional piston assemblies increase the thickness of the piston face, thereby also increasing weight and material volume. The present invention provides an outer piston layer supported by a corrugated insert. Each individual corrugated ridge 42a, 42b, 42c, etc., seen in FIG. 10, supports outer layer 22 at intermediate positions along the radial profile of piston 20. The intermediate support positions prevent the outer layer 22 from parabolically bending or deflecting inwardly as experienced in conventional piston. Thus, the outer layer is deflected by a smaller amount between adjacent corrugated ridges. Because the deflection of outer layer 22 experienced during compressed gas engagement is relatively small as compared to conventional piston designs, the thickness of outer layer 22 can be reduced, thereby reducing heat transfer to the piston, reducing weight and improving engine performance.

Referring again to FIG. 1, in some embodiments, a connecting rod 70 is pivotally attached to piston 20 to form a piston assembly 10. Connecting rod 70 generally joins a crankshaft to a piston in an engine. Connecting rod 70 in one embodiment includes multiple rod layers including at least a first rod layer 74a and a second rod layer 74b. The rod layers are generally rigidly attached, or mechanically secured, to each other. Connecting rod 70 can be disassembled to individual layers in some embodiments. For example, an individual rod layer may become damaged, cracked or broken, and connecting rod 70 can be disassembled, thereby allowing replacement or repair of the damaged rod layers. Individual connecting rod layers 74a, 74b, etc. can include iron, steel, brass, bronze, aluminum, titanium, plastic, fiberglass, carbon-fiber, ceramics, nickel, mixtures and alloys thereof or other rigid materials known in the art.

A connecting rod 70 having multiple layers can be formed by first attaching individual layer sheets together using an adhesive or other fastening means to form a laminated blank. The shape of the connecting rod 70 can then be formed by saw-cutting, milling, plasma cutting, stamping, pressing or using any other known shaping or cutting method to convert the laminated blank into a connecting rod 70. In another embodiment, the individual layers can be cut to the desired shape first, and then the individual layers can be subsequently secured together using a fastening means such as an adhesive, welding or mechanical fasteners.

Figure 11:
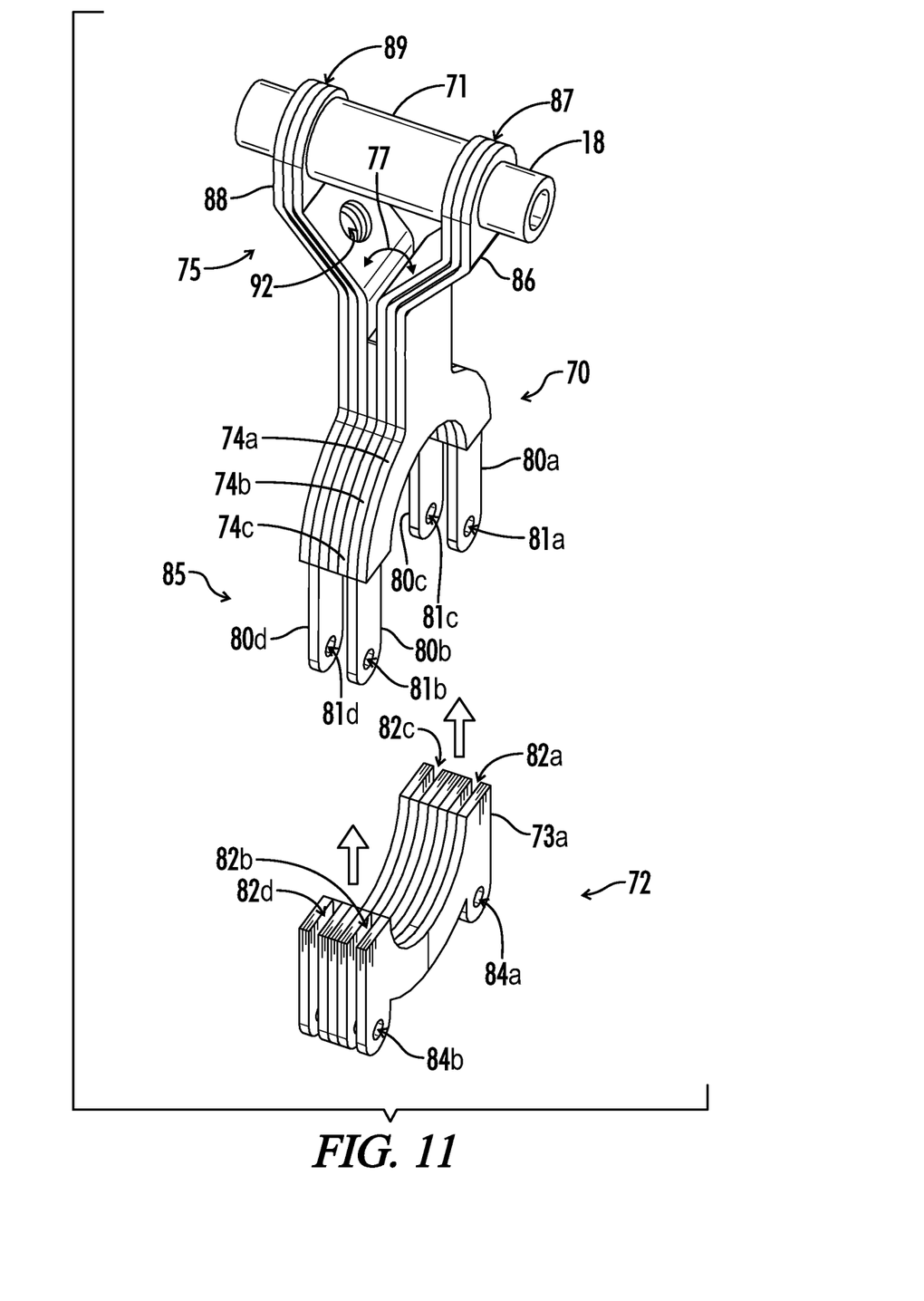
FIG. 11 illustrates an exploded perspective view of one embodiment of a connecting rod in accordance with the present invention.
Figure 12:
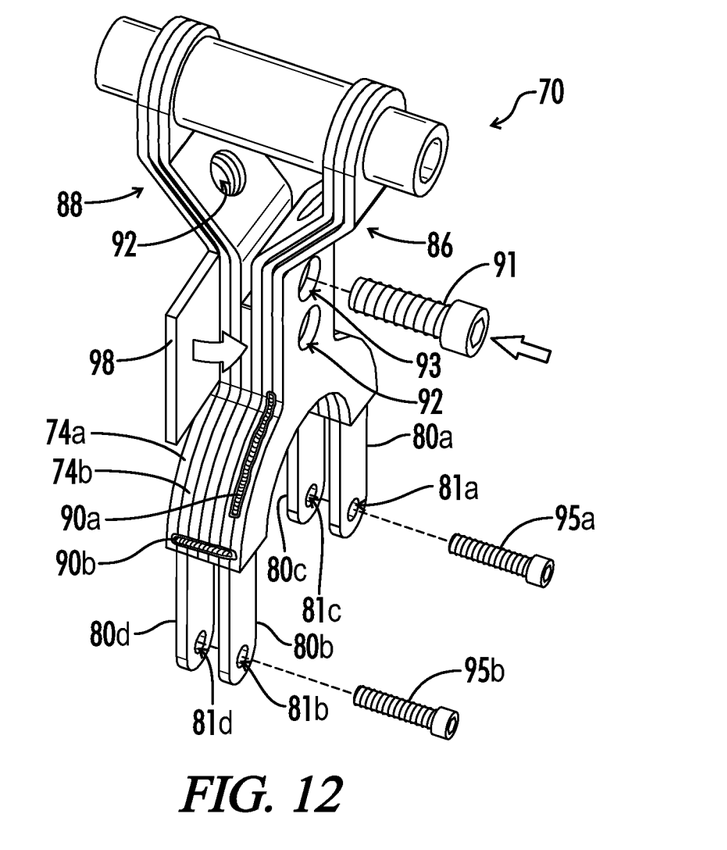
FIG. 12 illustrates a perspective view of one embodiment of a connecting rod in accordance with the present invention.

Referring to FIG. 12, in some embodiments, one or more mechanical rod layer fasteners 91, such as but not limited to a bolt, screw, pin or rivet, can be inserted through a corresponding transverse rod layer fastener hole 93 defined in each rod layer for rigidly attaching multiple rod layers together. In some embodiments, rod layer fastener hole 93 is threaded to engage corresponding threads on rod layer fastener 91. In other embodiments, rod layer fastener hole 93 is a clearance hole. Rod layers can also be welded together along the outer edges to secure the individual rod layers together. A longitudinal rod layer weld seam 90a, illustrated in FIG. 12, can extend along an outer edge of rod 70 joining together individual rod layers. Longitudinal weld seam 90a can extend completely around the perimeter of rod 70, including across one or both of first and second prongs 86, 88. In some embodiments, as seen in FIG. 12, longitudinal weld seam 90a can extend only partially across the longitudinal edge of connecting rod 70. Moreover, longitudinal weld seam 90a may extend laterally to join all rod layers. In some embodiments a lateral weld seam 90b extends transversely across the multiple rod layers. In other embodiments, weld seams 90a, 90b are used to secure only part of the total number of rod layers together, and other fastening means can be used to secure the remaining rod layers. Additionally, as illustrated in FIGS. 11 and 12, rod holes 92 can be defined in connecting rod 70, including in first and second prongs 86, 88, to reduce the weight of connecting rod 70. Rod holes 92 may consist of circular, oval, triangular, rectangular, or other geometric shapes in various spacing arrangements.

Referring further to FIG. 12, in some embodiments one or more rod layers 74a, 74b, etc. includes a rod layer flange 98 extending from at least one rod layer. Rod layer flange 98 can be bent toward the other rod layers to surround and rigidly secure the rod layers together. Multiple rod layer flanges 98 can extend from individual rod layers. Additionally, rod layer flanges 98 can extend from first and second prongs 86, 88, and can be bent around each prong to secure the individual layers together. It will be readily appreciated by those of skill in the art that a rod layer flange 98 can be used in combination with one or more weld seams 90a, 90b or other mechanical rod layer fasteners 91 for securing rod layers together.

Referring again to FIG. 11, connecting rod 70 can include a first rod end 75 forming a diverging section wherein at least two layers diverge at a rod layer divergence angle 77. In some embodiments, the rod layer divergence angle 77 is greater than about ten degrees. Connecting rod 70 includes a first rod prong 86 including a first wrist pin socket 87 defined therein. The first wrist pin socket 87 generally defines one or more socket holes shaped for receiving a wrist pin or piston bearing structure. The connecting rod 70 also includes a second rod prong 88 including a second wrist pin socket 89 defined therein. The second wrist pin socket 89 generally defines one or more socket holes defined therein and shaped for receiving a wrist pin or piston bearing structure. In some embodiments, the first and second wrist pin sockets 87, 89 are axially aligned.

As seen in FIG. 2A and in FIG. 11, in some embodiments a wrist pin, or piston pin 18, is disposed in the first and second wrist pin sockets 87, 89. The wrist pin 18 spans the prong gap defined between first and second prongs 86, 88. Wrist pin 18 can include a hollow cylinder or a rigid solid pin. Wrist pin 18 generally pivotally attaches connecting rod 70 to piston 20. As seen in FIG. 4, piston 20 can include one or more wrist pin holes 38a, 38b defined in skirt 24 and shaped for receiving wrist pin 18.

Referring again to FIG. 2A, in some embodiments, first and second prongs 86, 88 can move axially along wrist pin 18 during movement of piston 20 in an engine cylinder. A bending moment can also be imparted on first and second prongs 86, 88 during piston motion. Such movement or bending moment could cause first and second sockets 87, 89 to move. Such movement could reduce the strength or integrity of connecting rod 70 or reduce the performance of piston 20. In some embodiments, a pin sleeve 71 is disposed about wrist pin 70. Pin sleeve generally extends from first socket 87 to second socket 89 as generally illustrated in some embodiments in FIG. 2A and FIG. 11. Pin sleeve 71 can form a hollow cylinder and includes an inner diameter substantially equal to or greater than the outer diameter of wrist pin 70 such that pin sleeve 71 can be slid over the exterior of wrist pin 70. During use, pin sleeve 71 prevents first and second sockets 87, 89 from moving axially toward each other along wrist pin 70. Pin sleeve 71 can include a metal or ceramic material or other rigid materials known in the art. Additionally, in some embodiments, one or more rod layers can be thicker at the first rod end 75 to reduce the bending moment experienced in connecting rod 70 near the attachment to wrist pin 18 or piston 20.

Referring to FIG. 2A, in some embodiments wrist pin 18 is secured to prevent movement by an interference fit between wrist pin 18, pin sleeve 71, first socket 87 and second socket 89. In other embodiments wrist pin 70 is secured to prevent movement by snap rings internal to piston skirt 24. In other embodiments wrist pin 70 is secured to prevent movement by external snap rings outside of first socket 87 and second socket 89.

Referring further to FIG. 11, in some embodiments a bearing cap 72 can be attached to connecting rod 70. Connecting rod 70 includes a second rod end 85 extending away from piston 20. Second rod end 85 is generally adapted for attachment to a rod bearing, replaceable insert bearing, or a journal bearing on a crankshaft. Bearing cap 72 is attached to second rod end 85 to secure connecting rod 70 to the crankshaft.

As seen in FIG. 11, connecting rod 70 includes a plurality of pilot flanges 80a, 80b, etc. protruding from second rod end 85. Each pilot flange 80a, 80b, etc. engages a corresponding pilot groove 82a, 82b, etc. defined in bearing cap 72. Each pilot flange 80a, 80b, etc. can form an extension one or more corresponding layers in laminated connecting rod 70. Each pilot flange 80a, 80b, etc. can include a flange hole 81a, 81b, etc. as also illustrated generally in FIG. 12. Similarly, bearing cap 72 can include a plurality of bearing cap fastener holes 84a, 84b. Each bearing cap fastener hole can be aligned with one or more flange holes when bearing cap 72 is positioned on connecting rod 70. As such, a bearing cap fastener can be inserted through both a bearing cap fastener hole and at least one pilot flange hole for mechanically securing bearing cap 72 onto connecting rod 70. For example, first bearing cap fastener 95a can be inserted through first bearing cap fastener hole 84a, seen in FIG. 11 and also extend through first pilot flange hole 81a and third pilot flange hole 81c when bearing cap 72 is fully seated on connecting rod 70. Similarly, second bearing cap fastener 95b can be inserted through second bearing cap fastener hole 84b and also extend through second pilot flange hole 81b and fourth pilot flange hole 81d. As such, first and second bearing cap fasteners 95a, 95b are used to secure bearing cap 72 to connecting rod 70. In other embodiments, bearing cap 72 can be secured to connecting rod 70 using other attachment means including but not limited to one or more pins, bolts, nuts rivets, wires, tubes, welds or combinations thereof.

Generally, when connecting rod 70 is attached to a rod bearing, or a journal bearing, on a crankshaft, the pilot flanges 80a, 80b, etc. can be stretched during use. In some applications, pilot flanges are pre-tensioned prior to installation of bearing cap fasteners 95a, 95b to prevent the pilot flanges from stretching during use. In one embodiment, each pilot flange can be heated prior to attachment to the bearing cap 72 to temporarily lengthen the pilot flange. Thus, when each pilot flange cools after attachment to the bearing cap 72 each pilot flange will retract longitudinally, thereby pre-tensioning each pilot flange between connecting rod 70 and bearing cap 72.

Figure 13:
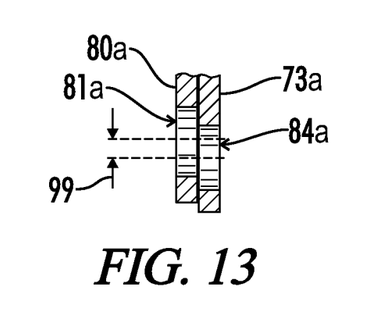
FIG. 13 illustrates a partial cross-sectional view of one embodiment of a connecting rod showing a bearing cap fastener hole offset.

Referring to FIG. 13, in some embodiments a pilot flange 80a includes a pilot flange hole 81a offset from adjacent bearing cap fastener hole 84a defined in an adjacent bearing cap layer 73a when bearing cap 72 is fully seated on connecting rod 70. Pilot flange hole 81a is offset from the adjacent bearing cap fastener hole 84a by a hole offset distance 99. Hole offset distance can be defined as the offset distance between the centerlines of pilot flange hole 81a and cap fastener hole 84a. In this embodiment, when chamfered bearing cap fastener 95a is inserted first through bearing cap fastener hole 84a and subsequently through pilot flange hole 81a, pilot flange 80a will be pulled away from connecting rod 70, thereby pre-tensioning pilot flange 80a. In other embodiments, the circumference of pilot flange hole 81a can be chamfered at an angle adjacent bearing cap layer 73a so that when cap fastener 95a is inserted through both cap fastener hole 84a and pilot flange hole 81a, pilot flange 80a is pulled in tension toward the bearing cap.

Figure 14:
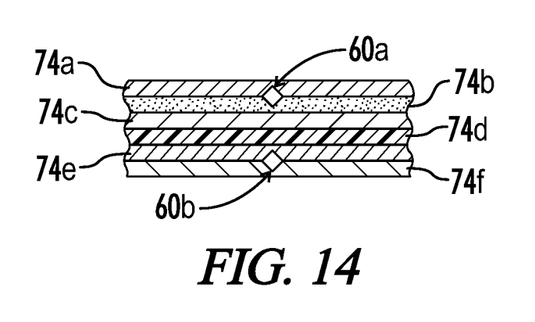
FIG. 14 illustrates a partial cross-sectional view of an embodiment of a connecting rod showing first and second slots for lubricant passage.

Referring now to FIG. 14, additionally, in some embodiments, connecting rod 70 can include multiple layers 74a, 74b, 74c, etc. comprising dissimilar materials. For example, first layer 74a can include a metal, and second layer 74b can include a composite or a polymer. Various other combinations of materials between layers can be arranged to reduce weight, improve vibration dissipation, and/or improve strength. Additionally, one or more layers can be grooved or machined with a longitudinal slot to allow oil to transfer from the rod bearing to the wrist pin or to the piston 20 and/or skirt 24 engaging the engine cylinder wall. For example, a first slot 60a can be defined partially in first and second layers 74a, 74b, and a second slot 60b can be defined between fifth and sixth layers 74e, 74f. It is understood that additional or fewer slots can be defined between adjacent layers in connecting rod 70 or bearing cap 72.

Thus, although there have been described particular embodiments of the present invention of a new and useful Reinforced Piston and Connecting Rod Assembly, it is not intended that such references be construed as limitations upon the scope of this invention except as set forth in the following claims.

What is claimed is:

1. A piston assembly, comprising:
   a piston having a piston face and a piston skirt, the piston skirt defining a skirt opening and a hollow interior cavity, the piston further comprising:
   an inner piston layer,
   an outer piston layer, and
   a corrugated disk insert having a plurality of substantially concentric corrugations disposed between the inner and outer piston layers; and
   a connecting rod pivotally attached to the piston.

2. The piston assembly of claim 1, wherein:
   the connecting rod has first and second rod layers, the first and second rod layers being rigidly connected; and
   the connecting rod includes a diverging region wherein the first and second rod layers diverge, the first rod layer forming a first rod prong and the second rod layer forming a second rod prong.

3. The piston assembly of claim 2, wherein the piston further comprises a wrist pin spanning the hollow interior cavity.

4. The piston assembly of claim 3, wherein:
   the first prong defines a first wrist pin socket;
   the second prong defines a second wrist pin socket; and
   the wrist pin pivotally extends through the first and second wrist pin sockets.

5. The piston assembly of claim 3, further comprising a sleeve concentrically disposed about the wrist pin between the first and second wrist pin sockets,
   wherein the sleeve engages both the first and second wrist pin sockets.

6. The piston assembly of claim 1, further comprising a circumferential interior skirt flange extending from the skirt toward the interior cavity, wherein the inner piston layer is supported by the interior skirt flange.

7. The piston assembly of claim 6, further comprising:
   a skirt rim positioned at an axial edge of the skirt; and
   a rim flange protruding radially inwardly from the skirt rim.

8. The piston assembly of claim 7, wherein the outer piston layer is positioned against the rim flange.

9. The piston assembly of claim 1, wherein the corrugated disk insert includes a plurality of holes defined therein.

10. A reinforced piston apparatus, comprising:
    a piston body including a piston skirt defining an interior cavity;
    an inner piston layer spanning the interior cavity;

an outer piston layer spanning the interior cavity spaced from the inner piston layer; and a corrugated disk insert disposed between the inner and outer piston layers, wherein the corrugated disk insert includes a plurality of substantially concentric corrugations.

11. The apparatus of claim 10, further comprising:

a skirt rim located at an axial edge of the skirt; and a rim flange protruding radially inwardly from the skirt rim, wherein the outer piston layer is positioned against the rim flange.

12. The apparatus of claim 11, wherein the rim flange is detachable from the skirt.

13. The apparatus of claim 10, further comprising an interior skirt flange protruding inwardly from the skirt toward the interior cavity, wherein the inner piston layer is positioned against the interior skirt flange.

14. The apparatus of claim 10, wherein the inner and outer piston layers are substantially parallel.

15. The apparatus of claim 10, wherein the outer piston layer includes a convex dome shape.

16. The apparatus of claim 10, wherein the disk insert comprises spring steel.

17. The apparatus of claim 10, further comprising a plurality of holes defined in the disk insert.

18. A reinforced piston apparatus, comprising:

a piston body including a piston skirt defining an interior cavity;

an inner piston layer spanning the interior cavity;

an outer piston layer spanning the interior cavity spaced from the inner piston layer; and a corrugated disk insert disposed between the inner and outer piston layers, wherein the corrugated disk insert includes a plurality of substantially radial corrugations.

19. The apparatus of claim 18, further comprising:

a skirt rim located at an axial edge of the skirt; and a rim flange protruding radially inwardly from the skirt rim, wherein the outer piston layer is positioned against the rim flange.

20. The apparatus of claim 19, wherein the rim flange is detachable from the skirt.

21. The apparatus of claim 19, further comprising an interior skirt flange protruding inwardly from the skirt toward the interior cavity, wherein the inner piston layer is positioned against the interior skirt flange.

22. The apparatus of claim 18, wherein the inner and outer piston layers are substantially parallel.

23. The apparatus of claim 18, wherein the outer piston layer includes a convex dome shape.

24. The apparatus of claim 18, wherein the disk insert comprises spring steel.

25. The apparatus of claim 10, further comprising a plurality of holes defined in the disk insert.

* * * * *